United States Patent [19]

Gander et al.

[11] 4,020,126

[45] Apr. 26, 1977

[54] POLYETHYLENE TEREPHTHALATE/TERPOLYMER BLENDS; FILMS, SHEETS, AND ARTICLES MADE USING SUCH BLENDS; AND METHOD OF MAKING TRAYS USING SUCH SHEETS

[75] Inventors: Frederick W. Gander, Kennett Square, Pa.; Erhard F. Hoegger, Wilmington, Del.; William P. Kane, Bon Air, Va.

[73] Assignee: E. I. Du Pont de Nemours and Company, Wilmington, Del.

[22] Filed: June 27, 1975

[21] Appl. No.: 591,096

Related U.S. Application Data

[63] Continuation of Ser. No. 488,826, Aug. 2, 1974, abandoned.

[52] U.S. Cl. .............................. 260/873; 260/37 R; 264/92; 264/94
[51] Int. Cl.² ....................................... C08G 39/10
[58] Field of Search ............... 260/873, 75, 80.81; 264/94

[56] References Cited

UNITED STATES PATENTS 3,562,200  2/1971  Jones et al. .................. 260/873 X
3,580,965  5/1971  Brinkmann et al. ............... 260/873
3,706,699  12/1972  Conix et al. .................... 260/873 X

FOREIGN PATENTS OR APPLICATIONS 82,565  6/1971  Germany ........................ 260/873

Primary Examiner—Theodore E. Pertilla

[57] ABSTRACT

Blends are provided including:
99 to 95% polyethylene terephthalate and
1 to 5% of a terpolymer of at least 65% ethylene with (a) at least 5% by weight of a vinyl ester of a lower (1-6 carbon) saturated monobasic aliphatic carboxylic acid and (b) 0.5 to 10% by weight of an acid of the group consisting of acrylic and methacrylic acids, said terpolymer having been made by a free-radical initiated polymerization of a mixture of ethylene, said ester and said acid.

Articles, such as cooking containers or trays, are provided made using such polyethylene terephthalate/terpolymer blends or made using sheets made from such blends. Such trays may be used for cooking food at temperatures up to about 400° F.

Methods are provided of making such trays including thermoforming such sheets made from such blends.

19 Claims, 1 Drawing Figure

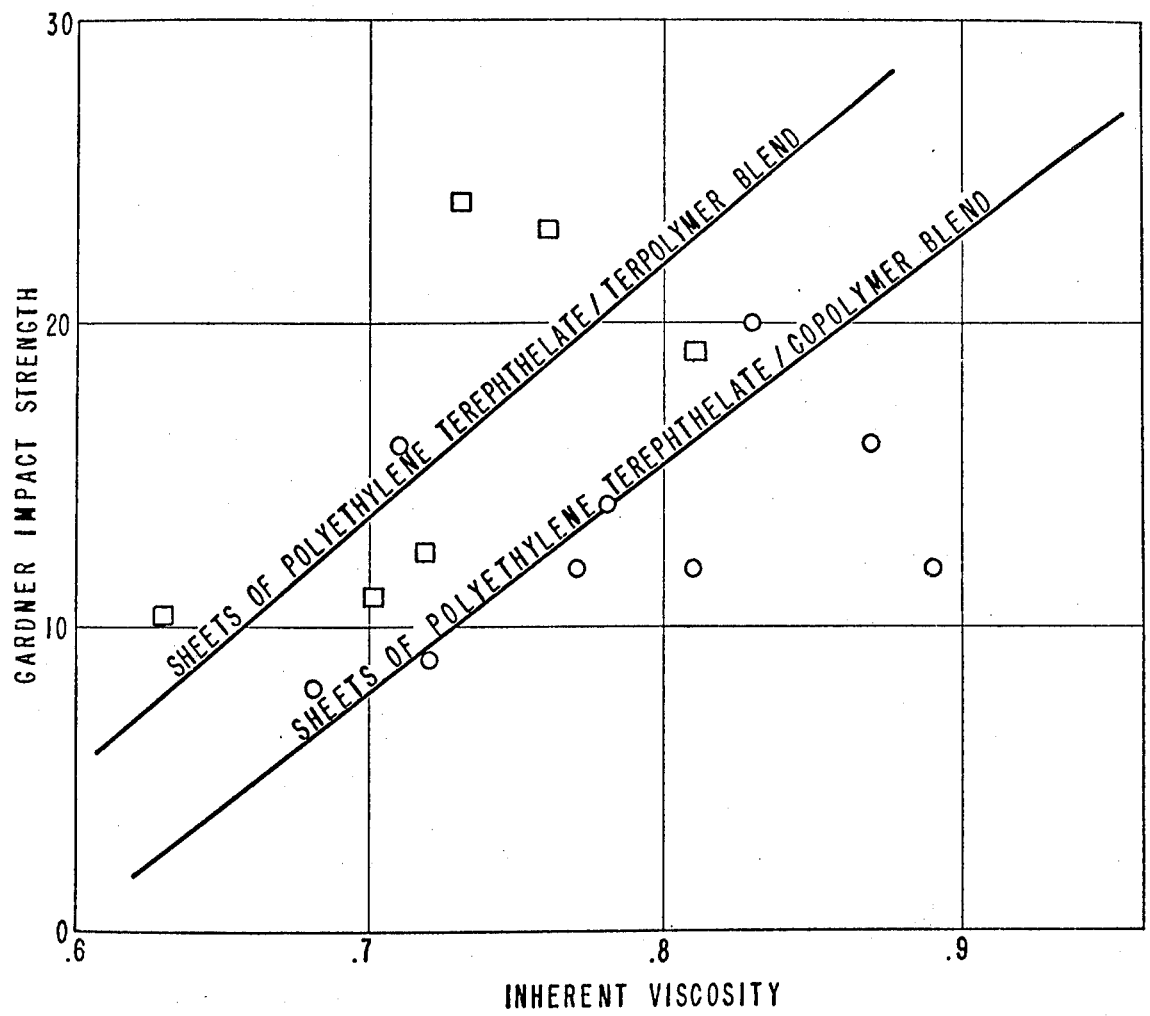

POLYETHYLENE TEREPHTHALATE/TERPOLYMER BLENDS; FILMS, SHEETS, AND ARTICLES MADE USING SUCH BLENDS; AND METHOD OF MAKING TRAYS USING SUCH SHEETS

This is a continuation of application Ser. No. 488,826, filed Aug. 2, 1974 now abandoned.

BACKGROUND OF THE INVENTION

1. Field of the Invention

This invention is a novel article of manufacture, such as a cooking container, or tray made using a novel material (i.e. made using a novel polyethylene terephthalate/terpolymer blend or made using a sheet made from this blend.)

This invention also is a method of making this tray by thermoforming the sheet made of the novel blend.

2. Description of the Prior Art

In the prior art, unmodified polyethylene terephthalate has been used in making shaped and other articles which utilize its toughness, its formability, its durability and its chemically and biologically inert behavior. For some uses, however, such unmodified polyethylene terephthalate has properties or deficiencies which make it unsuitable.

Accordingly, specialized blends have been developed to meet particular needs. For example, polyethylene terephthalate with copolymers of α-olefins and vinyl esters have been developed to enhance mechanical properties, such as hardness, impact strength, toughness and abrasion resistance.

A prior art polyethylene terephthalate copolymer blend of this type is disclosed in East German Economic Pat. No. 82,565. Such blend contains polyethylene terephthalate with 1–20% of "polyalkanes and/or ethylene: acrylic acid copolymers and/or vinyl esters."

A teaching of a polyethylene terephthalate α-olefin, vinyl acetate copolymer blend is found in U.S. Pat. No. 3,580,965 to Brinkmann. This patent discloses linear saturated polyesters of α-olefins and vinyl esters, such as ethylene-vinyl acetate. Increased toughness and impact strength in structures made using these blends, including those with nucleating agents, is indicated.

U.S. Pat. No. 3,706,699 to Conix relates to the manufacture of moulding materials starting from polyethylene terephthalate and teaches a process for the preparation of and a novel moulding material comprising polyethylene terephthalate having an inherent viscosity of 0.65 dl./g measured at 25° C. in a 60:40 mixture of phenol and tetrachloroethane in admixture with from about 0.1 to 10% by weight of a fusible copolymer and from about 0 to 1% by weight of a finely divided solid mineral substance.

Copending U.S. patent application Ser. No. 305,250, filed Nov. 10, 1972 (Kane), which is exemplary of the cooking container arts, shows a polyethylene terephthalate tray with a polyethylene terephthalate lid bonded to the upper surface thereof. The lid prevents leakage from the tray but permits peeling of the lid from the tray, without tearing, after cooking.

U.S. Pat. No. 3,470,281 to Knowles is exemplary of the thermoforming arts. Such patent shows a method of forming a flanged container using container forming apparatus including a cavity block having an open-ended cavity therein. Suitable venting passages permit a venting of air entrapped between the cavity wall and the stock material as the stock material takes on the shape dictated by the contour of the wall surface of the cavity.

Another example of the thermoforming arts is copending U.S. patent application Ser. No. 333,530, filed Feb. 20, 1973 which shows an improved mold for venting air between the mold cavity and the film or sheet being drawn against the surface of the cavity in the thermoforming operation, while forming a tray or cooking container.

None of these patents show the novel polyethylene terephthalate/terpolymer blends, or films, sheets or articles made using such blends, or articles, such as trays, made using such sheets, or methods of making these trays, all of this invention and all providing improvements in their respective arts.

SUMMARY OF THE INVENTION

Essentially, and broadly stated, this invention is the discovery that by adding from 1 to 5% by weight of a terpolymer to polyethylene terephthalate there is provided a novel and useful blend (hereinafter called polyethylene terephthalate/terpolymer blend) that may be used to make materials, such as films or sheets, having improved properties.

Sheets made from the polyethylene terephthalate/terpolymer blends of this invention have been found to be particularly useful for making thermoformed trays of greater toughness and with greater freedom from embrittlement or sagging after heating, at temperatures up to about 400° F., for example, as compared to trays of unmodified polyethylene terephthalate or of polyethylene terephthalate with previously used modifiers. Other benefits which arise from these sheets as used in thermoformed structures or trays include more rapid crystallization, providing better form stability in newly-formed structures, as well as improved mold release and forming properties. Further, trays made using sheets of such polyethylene terephthalate/terpolymer blends may be formed in known vacuum forming equipment (i.e., theremoforming equipment) at a reduced cycle time, as compared to trays made using sheets of unmodified polyethylene terephthalate (or made from known blends), for example.

According to the present invention, articles, such as cooking containers or trays, also are provided for the packaging of food and for use in the subsequent cooking and reheating of the food in preparation for human consumption.

Trays of various materials have been widely employed for packaging and direct consumption therefrom of preprocessed foods. Limitations of materials from which such trays were formed have resulted in restrictions in use in such trays.

Previously it has been the practice to form trays of heat-sealable polymers, such as vinyls and olefins, to facilitate securing lids thereon, but these in general do not possess the thermal stability required for reheating foods. Formed trays of aluminum foil have been employed, but these lack versatility in that they are unsuitable for use in microwave ovens, for example.

The requirements for a satisfactory, versatile tray to which the present invention is directed are that it should permit cooking of its contents up to about F., and should have thermal stability and not embrittle or be prone to cracking upon heating. Further, it should not become distorted upon heating.

The present invention provides a tray having these particular characteristics.

The tray is formed from a sheet of a polyethylene terephthalate/terpolymer blend as will further be described in detail. The food in the tray may be reheated or heated to temperatures up to about 400° F.

In short, then, this invention in one embodiment is a cooking container, in the form of a tray, that can be effectively used for cooking, or reheating, at desired oven temperatures.

Lastly, this invention, in another embodiment, is a method of thermoforming sheets also of this invention in making these trays. The improvements of better mold release, reduced cycle time, improved forming etc., are among the highly sought advantages obtained by this method.

BRIEF DESCRIPTION OF THE DRAWING

The drawing is a graph comparing sheets made from a polyethylene terephthalate/terpolymer blend of this invention with sheets made from a polyethylene terephthalate/copolymer blend as to their impact strengths (inch-pounds) at various inherent viscosities.

DESCRIPTION OF THE PREFERRED EMBODIMENT

This invention is a polyethylene terephthalate/terpolymer blend; films, sheets and articles made from such blend; trays made from such sheets; and, a method of making these trays.

Specifically, a blend of this invention includes:
99 to 99% polyethylene terephthalate and
1 to 5% of a terpolymer of at least 65% ethylene with (a) at least 5% by weight of a vinyl ester of a lower (1-6 carbon) saturated monobasic aliphatic carboxylic acid and (b) 0.5 to 10% by weight of an acid of the group consisting of acrylic and methacrylic acids, said terpolymer having been made by a free-radical initiated polymerization of a mixture of ethylene, said ester and said acid.

In such blend, the ester may be vinyl acetate; or the ester may be vinyl acetate and the acid methacrylic acid, or, the ester may be vinyl acetate and the acid, acrylic acid.

Another blend of this invention includes:
99 to 95% polyethylene terephthalate and
1 to 5% of a terpolymer of at least 65% ethylene with (a) 20 to 30% by weight of a vinyl ester of a 1–4 carbon saturated monobasic aliphatic carboxylic acid and (b) 0.5 to 10% by weight of an acid of the group consisting of acrylic and methacrylic acids, said terpolymer having been made by a free-radical initiated polymerization of a mixture of ethylene, said ester and said acid.

Still further terpolymersusable in blends of this invention (1 to 5% by weight of the terpolymer) include:
a terpolymer of at least 65% ethylene with (a) at least 12% by weight of a vinyl ester of a 1–4 carbon saturated monobasic aliphatic carboxylic acid and (b) 0.5 to 3% by weight of an acid of the group consisting of acrylic and methacrylic acids, said terpolymer having been made by a free-radical initiated polymerization of a mixture of ethylene, said ester and said acid;

a terpolymer of at least 65% ethylene with (a) at least 12% by weight of a vinyl ester of a 1–4 carbon saturated monobasic aliphatic carboxylic acid and (b) 0.5 to 7% by weight of an acid of the group consisting of acrylic and methacrylic acids, said terpolymer having been made by a free-radical initiated polymerization of a mixture of ethylene, said ester and said acid;

a terpolymer of at least 65% ethylene with 20 to 30% by weight vinyl acetate and 0.1 to 7% by weight methacrylic acid, said terpolymer having been made by a free-radical initiated polymerization of a mixture of ethylene, vinyl acetate and methacrylic acid; and, a terpolymer of at least 65% ethylene with 20 to 30% by weight vinyl acetate and 0.1 to 7% by weight acrylic acid, said terpolymer having been made by a free-radical initiated polymerization of a mixture of ethylene, vinyl acetate and acrylic acid.

A preferred terpolymer consists of 72% ethylene, 27% vinyl acetate, and 1% methacrylic acid.

The above-described terpolymers are examples of those which can be used in the polyethylene terphthalate/terpolymer blends of this invention. Still others which may be used are described in detail in U.S. Pat. No. 3,215,678 to Adelman et al., which patent is hereby incorporated by reference.

Polyethylene terephthalate which can be used in the blend of this invention include (a) polymers wherein at least 97% of the polymer contains the repeating ethylene terephthalate units of the formula:

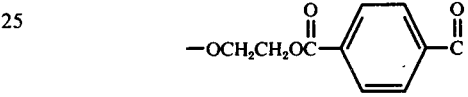

with the remainder being minor amounts of ester-forming components, and (b) copolymers of ethylene terephthalate wherein up to 10 mole percent of the copolymer is prepared from the monomer units of diethylene glycol; propane- 1,3-diol; butane- 1,4-diol; polytetramethylene glycol; polyethylene glycol; polypropylene glycol; 1,4-hydroxymethylcyclohexane; and the like, substituted for the glycol moiety in the preparation of the copolymer and/or or isophthalic; bibenzoic; naphthalene 1,4- or 2,6-dicarboxylic; adipic; sebacic; decane-1,10-dicarboxylic acid; and the like, substituted for the acid moiety in the preparation of the copolymer.

Specific limits on the amount of comonomer are governed by the polymer glass transition temperature since it has been found that copolymers having a glass transition temperature below about 50° c. generally have reduced mechanical properties. This generally corresponds to the addition of no more than 10 mole percent comonomer. One exception to this is the addition of bibenzoic acid where the copolymer glass transition temperature remains above 50° C. even when the copolymer contains more than 10 mole percent bibenzoic acid. Other exceptions will be obvious to the artisan. Glass transition temperatures are as determined using standard differential scanning calorimetry techniques.

In the blends of this invention the polyethylene terephthalate may contain (from 0.1 to 1.5% weight) a finely divided inert mineral solid substance, or a nucleating agent. The nucleating agent may be selected from the group consisting of calcium carbonate, aluminum silicates, and talc, for example. If desired, the polyethylene terephthalate may contain a nucleating agent and opacifying agent, such as titanium dioxide. Preferably, the polyethylene terephthalate contains 1% talc and 1.5% titanium dioxide. The inherent viscosity of the blend, preferably, is from 0.70 to 0.95 and for a shaped article formed from the blend, such inherent viscosity, preferably, is from 0.65 to 0.85.

As used herein, inherent viscosity is based on a 1% concentration of polymer in a 75/25 weight percent solution of trifluoroacetic acid/methylene chloride, respectively, at 30° C. and is computed using the formula:

$$\text{Inherent viscosity} = \frac{\text{natural log}\left(\frac{\text{viscosity of solution}}{\text{viscosity of solvent}}\right)}{C}$$

where C is the concentration expressed in grams of polymer per 100 milliliters of solution.

The preferred polyethylene terephthalate/terpolymer blend of this invention for making sheets for use in making trays contains 1 to 5% by weight, and preferably 3% by weight, of the terpolymer.

In preparing the blends of the present invention, the components should be pre-dried at temperatures and pressures such as to obtain maximum drying while avoiding agglomeration. They may be blended by metering the individual streams into a single or twin screw extruder which serves to melt and mix the components. The blend, thus mixed and melted, may then be extruded by known methods.

Films, sheets and shaped articles made from a blend of this invention have improved properties. They, too, are a part of this invention.

As an example, by using such blend, enhanced toughness is found in articles and films and sheets made therefrom. This toughness is present, for example, in the sheet which may be formed into a tray, and it is present in the tray before and after it has been heated at temperatures up to about 400° F. Such trays, for example, are not brittle and do not sag as is the case with trays made using known blends, such as polyethylene terephthalate/ethylene vinyl acetate blends. Sheets or films made from the blends of the instant invention (including cast amorphous sheets) may be prepared by known methods and devices, as for example, are shown in U.S. Pat. No. 2,823,421 to Scarlett, which is incorporated by reference herein.

This invention further is an improved method of making such trays including the steps of:

thermoforming a sheet made from a polyethylene terephthalate/terpolymer blend by drawing such sheet into a heated mold; and removing the tray formed thereby from the mold; and wherein the blend includes from about 1 to 5% by weight of the terpolymer and wherein such terpolymer, preferably, consists of 72% ethylene, 27% vinyl acetate, and 1% methacrylic acid.

Briefly described, in such method a polyethylene terephthalate/terpolymer blend sheet is positioned ajacent and overlying the mold (consisting of separate body and bottom parts).

After such sheet has been clamped in proper position and appropriately heated to the particular temperature desired, depending upon the particular sheet used and the most suitable temperature for undertaking the forming operation, such sheet is moved into the cavity defined by the mold.

In the simplest thermoforming methods, such as straight vacuum forming, this movement of the sheet into the mold cavity may be accomplished by vacuum alone; however, it is understood that such movement may be with a plug assist mean or other means to engage the film from the top and dispose the sheet which is in formable condition within the cavity which is to provide the desired final configuration of the sheet to form the molded article, i.e. a tray.

If desired, the pressure may be introduced over the film whereby it is pressed tightly against the inner surface of the cavity thereby forming the sheet into the desired configuration. This operation may be combined by a vacuum assist or vacuum forming step in which air is withdrawn from the cavity to thereby draw the sheet against the inner surface of such cavity.

If desired, such as in the straight vacuum forming method, the vacuum alone may draw the sheet against the inner surface of the cavity.

Any number of thermoforming methods and devices in which a sheet, suitably clamped, is drawn or pushed into a mold using the vacuum whereby such sheet takes the shape of the inner surface of the mold which it is brought into contact with to form the molded article or container may be used in practicing this invention. The methods may include (1) straight vacuum forming (2) drape forming (3) match-mold forming (4) slip-ring forming (5) plug-assist vacuum forming (6) plug-assist pressure forming (7) snap-vacuum forming (8) billow forming (9) trapped-sheet, contact-heat pressure forming and (10) preheat, plug-assist pressure forming.

Means for performing this method (and more specific method details) are to be found in copending U.S. Patent application Ser. No. 333,530, filed Feb. 20, 1973, which application is incorporated herein by reference.

By using the novel sheets of this invention, formed of the novel polyethylene terephthalate/terpolymer blends also of this invention, these basic methods may be practiced in an improved fashion, with reduced cycle times, with better release and forming advantages, than could such methods when used with known materials, such as unmodified polyethylene terephthalate, for example.

The improvements brought about by the instant invention are numerous and of great utility to the chemical, sheet and film-making, and container (tray) arts, for example. Some of such improvements may be noted by referring to the following Table I:

TABLE I

| Materials[1] | Minimum Cycle Time (sec) | Release[2] | Forming[3] | Before Cooking Tray Durability(ft./lb.) | After Cooking Tray Durability |
|---|---|---|---|---|---|
| 1. Polyethylene Terephthalate | 7 | Normal | Normal | .154 | Slightly Brittle |
| 2. Blend No. 1* | 5 | Better than Normal | Excellent | 1.685 | Not Brittle |
| 3. Blend No. 2** | 8 | Poor | Very Poor | 2.114 | Not Brittle- some sagging |

TABLE I-continued

| Materials[1] | Minimum Cycle Time (sec) | Release[2] | Forming[3] | Before Cooking Tray Durability(ft./lb.) | After Cooking Tray Durability at 350° – 390° F. |
|---|---|---|---|---|---|

[1] In all these materials the polyethylene terephthalate component contains 1% talc and 1.5% titanium dioxide
[2] Doesn't stick when removed from mold
[3] Conforms readily to mold shape during thermoforming
*97% Polyethylene Terephthalate/3% Terpolymer (72% ethylene, 27% vinyl acetate, and 1% methacrylic acid)
**93.6 Polyethylene Terephthalate/6.4% Terpolymer (same in Blend No. 1 above)

This Table I show various improvements (for example, durability) brought about in trays formed from the preferred material of this invention and in the thermoforming of such trays, by methods as previously discussed, including lower cycle times, and improved release and forming during the thermoforming operation.

The drawing shows improvements in sheets brought about by using the polyethylene terephthalate/terpolymer blend of this invention, as compared to sheets using known polyethylene terephthalate/copolymer blends.

The polyethylene terephthalate/terpolymer blend sheets tested contained 96% polyethylene terephthalate and 3% of the terpolymer which consisted of 72% ethylene, 27% vinyl acetate, and 1% methacrylic acid, while the polyethylene terephthalate/copolymer blend sheets contained 96% polyethylene terephthalate and 3% of the copolymer which consisted of 72% ethylene and 28% vinyl acetate. Both the polyethylene terephthalate/terpolymer and polyethylene terephthalate/copolymer blends contained 1% talc.

In making the sheets tested, the polyethylene terephthalate/terpolymer and polyethylene terephthalate/copolymer blends were extruded onto a cooled surface, after which the amphorous sheets formed thereby were stripped from the surface. These sheets were then brought into contact with a heated surface and crystallized at 150° C. for 100 seconds. Such sheets, after crystallization, were then tested at room temperature using a Gardner impact tester. The results of these tests appear in the graph which clearly shows the improvements in impact strengths brought about by the instant invention.

The following Example and Table II also show tray forming and tray durability improvements brought about by this invention.

Example

Samples of polyethylene terephthalate were blended with a terpolymer (of 72% ethylene, 28% vinyl acetate and 1% methacrylic acid) and compared to polyethylene terephthalate samples blended with a copolymer (of 72% ethylene and 28% vinyl acetate) with respect to tray formability and durability after oven heating. All samples contained 96% polyethylene terephthalate, 3% of the terpolymer or copolymer, each with 1% talc, all by weight based on the total weight of the blend.

The samples were prepared from the carefully dried components, melt blended in a screw extruder and cast onto a cooled quench roll to form amorphous sheets. The amorphous sheets, ranging in thickness from 13 to 18 mils, were evaluated for formability by preheating the sheet from 8 to 10 seconds to a temperature from 90 to 100° C., and forming in a heated vacuum forming mold. Mold cycle times and mold temperatures varied as shown in Table II.

Formability, or molding quality, including conformation to the mold cavity, the uniformity of the lip of the formed tray, and the ease of mold release were evaluated with results as shown in Table II.

The performance of the formed tray with respect to toughness or brittleness, (i.e., durability) were evaluated after oven heating for 15 minutes at 200° C., with results also as shown in Table II.

In this durability evaluation the trays were flicked with a finger after such oven heating and cooling to room temperature and, as Table II shows, trays formed from sheets of polyethylene terephthalate blended with the terpolymer were "tough" and undamaged while trays formed of sheets made using the copolymer were so "brittle" they shattered at the point of impact.

TABLE II

TRAY FORMABILITY AND TRAY DURABILITY

| Polymer* Added | Blend Inherent Viscosity | Mold Temp.-° C. | Mold Cycle-Time Sec. | Cavity Conformation** | Lip Regularity** | Mold Release*** | Oven heating min./° C. | Remarks |
|---|---|---|---|---|---|---|---|---|
| Ter. | 0.78 | 170 | 10 | 1.5 | 1.5 | 1 | — | — |
| Ter. | 0.75 | 170 | 10 | 1.5 | 1 | 2 | — | Tough |
| Co. | 0.77 | 170 | 10 | 4 | 2 | 1 | 15/200 | Poor fill, brittle |
| Ter. | 0.78 | 160 | 8 | 2 | 1 | 1 | 15/200 | Tough |
| Co. | 0.77 | 160 | 8 | 3 | 3 | 1.5 | 15/200 | Brittle |
| Co. | 0.77 | 160 | 8 | 3 | 3 | 1.5 | 15/200 | — |
| Ter. | 0.81 | 155 | 8 | 1 | 1 | 1 | — | Good release |
| Co. | 0.81 | 155 | 8 | 2 | 1 | 3 | — | Mold hangup |
| Co. | 0.83 | 150 | 8 | 3 | 2 | 3 | — | Mold hangup |
| Ter. | 0.76 | 150 | 8 | 1 | 1.5 | 1 | — | Good mold release |
| Co. | 0.71 | 150 | 8 | 1 | 1.5 | 1 | — | — |
| Co. | 0.71 | 150 | 8 | 1 | 1 | 1.5 | 15/200 | Brittle, yellow |
| Co. | 0.71 | 150 | 8 | 2 | 1 | 2 | 15/200 | Uneven, thin spot |
| Ter. | 0.70 | 150 | 6 | 1 | 1 | 1 | — | Good mold release |
| Co. | 0.71 | 150 | 6 | 1 | 1 | 3 | — | Mold hang up |

TABLE II-continued
TRAY FORMABILITY AND TRAY DURABILITY

| Polymer* Added | Blend Inherent Viscosity | Mold Temp.-° C. | Mold Cycle-Time Sec. | Cavity Conformation** | Lip Regularity** | Mold Release*** | Oven heating min./° C. | Remarks |
|---|---|---|---|---|---|---|---|---|
| Ter. | 0.70 | 150 | 6 | 1 | 1 | 1 | 15/200 | Tough |
| Co. | 0.71 | 150 | 6 | 1 | 1 | 3 | 15/200 | Brittle yellow |

*Terpolymer (Ter.) of 72% ethylene, 27% vinyl acetate and 1% methacrylic acid, by weight.
Copolymer (Co.) of 72% ethylene and 28% vinyl acetate, by weight.
**Molding Quality
1 - Perfect
2 - Good
3 - Fair-Poor
4 - Unacceptable
***Mold Release
1 - Good release, no flash
2 - Good release, slight flash
3 - Poor release, much flash

We claim:

1. A thermoformable sheet made from a blend including:
   99 to 95% polyethylene terephthalate and
   1 to 5% of a terpolymer of at least 65% ethylene with (a) at least 5% by weight of a vinyl ester of a lower (1–6 carbon) saturated monobasic aliphatic carboxylic acid and (b) 0.5 to 10% by weight of an acid of the group consisting of acrylic and methacrylic acids, said terpolymer having been made by a free-radical initiated polymerization of a mixture of ethylene, said ester and said acid.

2. A thermoformable sheet made from a blend including:
   99 to 95% polyethylene terephtalate and 1 to 5% of a terpolymer of at least 65% ethylene with (a) 20 to 30% by weight of a vinylester of a 1–4 carbon saturated monobasic aliphatic carboxylic acid and (b) 0.5 to 10% by weight of an acid of the group consisting of acrylic and methacrylic acids, said terpolymer having been made by a free-radical initiated polymerization of a mixture of ethylene, said ester and said acid.

3. A thermoformable sheet made from a blend including: 99 to 95% polyethylene terephthalate and 1 to 5% of a terpolymer of at least 65% ethylene with (a) at least 12% by weight of a vinylester of a 1–4 carbon saturated monobasic aliphatic carboxylic acid and (b) 0.5 to 3% by weight of an acid of the group consisting of acrylic and methacrylic acids, said terpolymer having been made by a free-radical initiated polymerization of a mixture of ethylene, said ester and said acid.

4. a thermoformable sheet made from a blend including:
   99 to 95% polyethylene terephthalate and
   1 to 5% of a terpolymer of at least 65% ethylene with (a) at least 12% by weight of a vinyl ester of a 1–4 carbon saturated monobasic aliphatic carboxylic acid and (b) 0.5 to 7% by weight of an acid of the group consisting of acrylic and methacrylic acids, said terpolymer having been made by a free-radical initiated polymerization of a mixture of ethylene, said ester and said acid.

5. A thermoformable sheet made from a blend including:
   99 to 95% polyethylene terephthalate and
   1 to 5% of a terpolymer of at least 65% ethylene with 20 to 30% by weight vinyl acetate and 0.1 to 7% by weight methacrylic acid, said terpolymer having been made by a free-radical initiated polymerization of a mixture of ethylene, vinyl acetate and methacrylic acid.

6. A theremoformable sheet made from a blend including:
   99 to 95% polyethylene terephthalate and
   1 to 5% of a terpolymer of at least 65% ethylene with 20 to 30% by weight vinyl acetate and 0.1 to 7% by weight acrylic acid, said terpolymer having been made by a free-radical initiated polymerization of a mixture of ethylene, vinyl acetate and acrylic acid.

7. A sheet according to claim 1 wherein the ester is vinyl acetate.

8. A sheet according to claim 1 wherein the ester is vinyl acetate and the acid is methacrylic acid.

9. A sheet according to claim 1 wherein the ester is vinyl acetate and the acid is acrylic acid.

10. A sheet of claim 1 wherein such terpolymer consists of 72% ethylene, 27% vinyl acetate, and 1% methacrylic acid.

11. The sheet of claim 1 wherein the polyethylene terephthalate contains from 0.1 to 1.5% by weight of a finely divided inert mineral solid substance.

12. The sheet of claim 1 wherein the polyethylene terephthalate contains talc and titanium dioxide.

13. The sheet of claim 1 wherein the polyethylene terephthalate contains a nucleating agent.

14. The sheet of claim 13 wherein the nucleating agent is selected from the group consisting of calcium carbonate, aluminum silicates, and talc.

15. The sheet of claim 1 wherein the polyethylene terephthalate contains a nucleating agent and opacifying agent.

16. The sheet of claim 15 wherein the opacifying agent is titanium dioxide.

17. The sheet of claim 15 wherein the polyethylene terephthalate contains 1% talc and 1.5% titanium dioxide.

18. The sheet of claim 1 wherein the terpolymer constitutes about 3% by weight of the blend.

19. The sheet of claim 1 wherein the inherent viscosity of the blend is from 0.70 to 0.95.

* * * * *